(12) United States Patent
Tashiro (10) Patent No.: US 10,247,286 B2
(45) Date of Patent: Apr. 2, 2019

(54) BALL SCREW DEVICE

(71) Applicant: JTEKT CORPORATION, Osaka-shi, Osaka (JP)

(72) Inventor: Akiyoshi Tashiro, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/928,240

(22) Filed: Mar. 22, 2018

(65) Prior Publication Data

US 2018/0283510 A1  Oct. 4, 2018

(30) Foreign Application Priority Data

Mar. 29, 2017  (JP) .................................. 2017-066087

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/22* | (2006.01) |
| *F16H 25/20* | (2006.01) |

(52) U.S. Cl.
CPC ..... *F16H 25/2238* (2013.01); *F16H 25/2015* (2013.01)

(58) Field of Classification Search
CPC .......................... F16H 25/2233; F16H 25/2238
See application file for complete search history.

(56) References Cited

U.S. PATENT DOCUMENTS

| | | | | |
|---|---|---|---|---|
| 2,844,044 A | * | 7/1958 | Cole ....................... | F16C 33/37 126/25 A |
| 2011/0162935 A1 | * | 7/2011 | Winkler .............. | F16H 25/2238 192/219.4 |
| 2016/0033019 A1 | | 2/2016 | Aramoto et al. | |

FOREIGN PATENT DOCUMENTS

JP    2016-035322 A    3/2016

* cited by examiner

*Primary Examiner* — Jake Cook
(74) *Attorney, Agent, or Firm* — Oliff PLC (57) ABSTRACT

A ball screw device includes a screw shaft, a nut, a ball train including a plurality of main balls, and a plurality of coil springs disposed in the ball train. The nut moves from a first axial side to a second axial side while an axial force is applied to the nut by rotation of the screw shaft. The plurality of coil springs are more densely arranged on the first axial side than on the second axial side in the ball train.

4 Claims, 9 Drawing Sheets

BALL SCREW DEVICE

INCORPORATION BY REFERENCE

The disclosure of Japanese Patent Application No. 2017-066087 filed on Mar. 29, 2017 including the specification, drawings and abstract, is incorporated herein by reference in its entirety.

BACKGROUND OF THE INVENTION

1. Field of the Invention

The invention relates to a ball screw device.

2. Description of the Related Art

Figure 7:
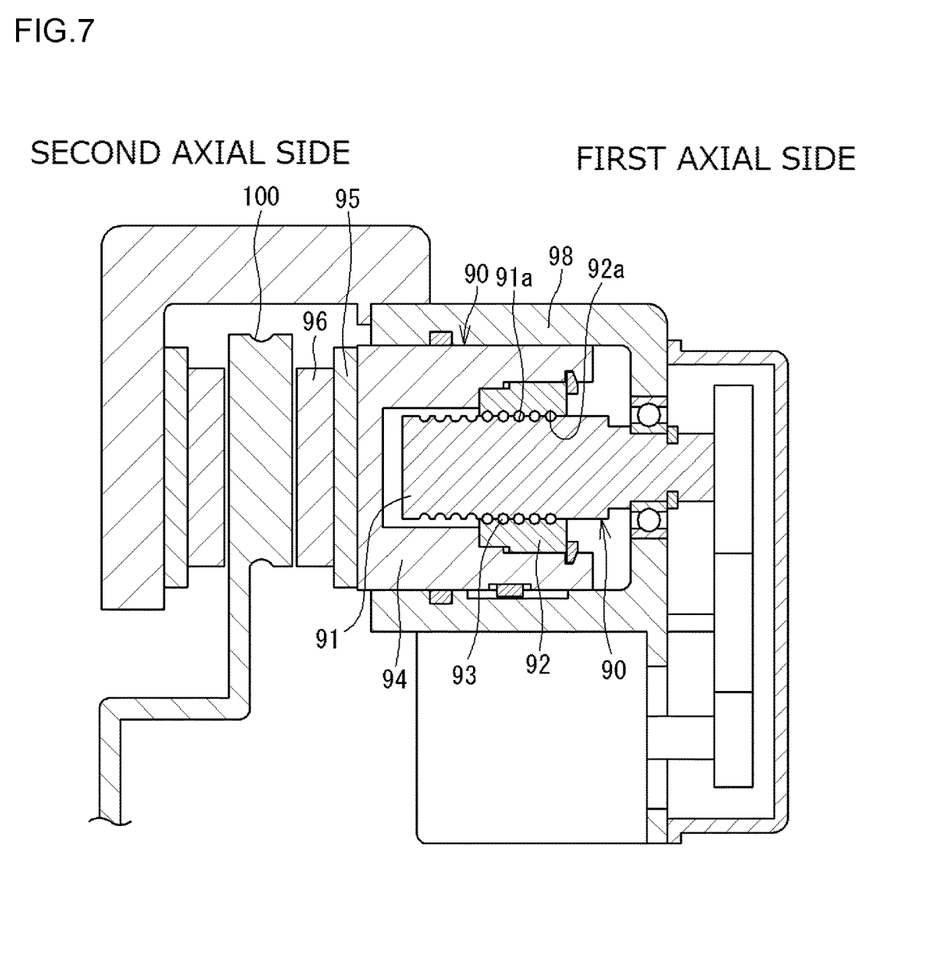
FIG. 7 is a cross-sectional view illustrating a related-art ball screw device included a braking device for an automobile.

Ball screw devices can convert rotational motion into linear motion, and are widely used in various fields (see, for example, Japanese Patent Application Publication No. 2016-35322 (JP 2016-35322 A)). FIG. 7 is a cross-sectional view illustrating a ball screw device 90 included in a braking device for an automobile. The ball screw device 90 includes a screw shaft 91, a nut 92, and a plurality of main balls 93. The nut 92 is disposed on the outer periphery of the screw shaft 91. The main balls 93 are disposed between a helical groove 91a of the screw shaft 91 and a helical groove 92a of the nut 92. The nut 92 is attached to a housing 94 having a bottomed cylindrical shape. In a cylindrical portion (cylinder) 98 of the braking device, the housing 94 is movable in the axial direction, but is not rotatable in the circumferential direction. With this configuration, when the screw shaft 91 is rotated by a motor (not illustrated), the nut 92 and the housing 94 advance (or retract). In the case of the braking device, a pad 96 is attached to the housing 94 via a backup plate 95. When the housing 94 advances, the pad 96 comes into contact with a disk 100 that rotates with wheels of the automobile, thereby generating a braking force.

In the ball screw device 90, a ball train including the plurality of main balls 93 is disposed between the helical groove 91a of the screw shaft 91 and the helical groove 92a of the nut 92. In some ball screw devices, coil springs are disposed at intervals in a ball train as disclosed in, for example, U.S. Patent No. 20110162935, FIG. 2.

Figure 8:
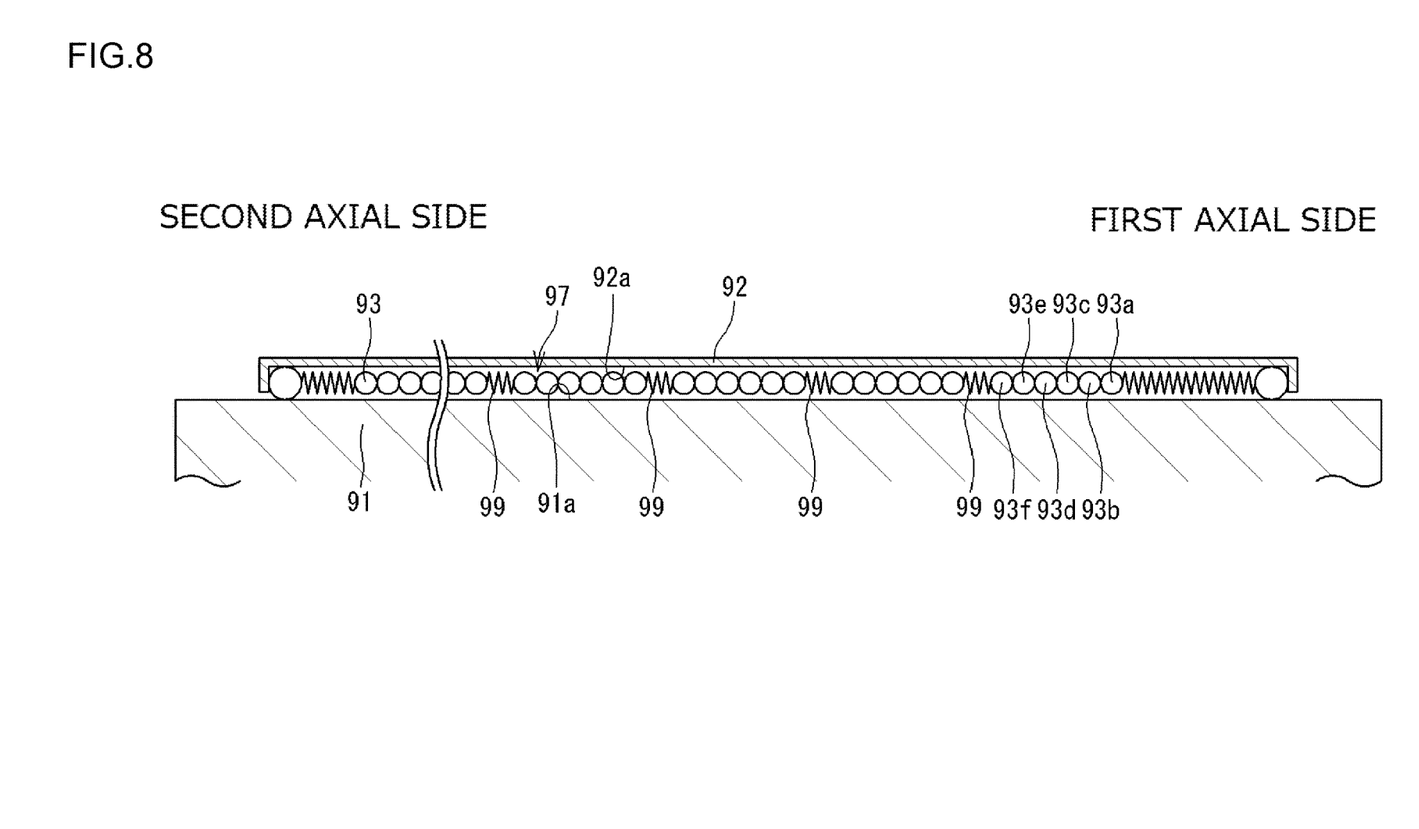
FIG. 8 is an explanatory diagram illustrating a helical groove of a screw shaft and a helical groove of a nut in the related-art ball screw device developed on a plane.

FIG. 8 is an explanatory diagram illustrating the helical groove 91a of the screw shaft 91 and the helical groove 92a of the nut 92 in the related-art ball screw device developed on a plane. In the ball screw device, a plurality of coil springs 99 are disposed at regular intervals in a ball train 97. Each coil spring 99 can reduce a delay in advancement of the main balls 93 while the ball screw device is operating.

Figure 9:
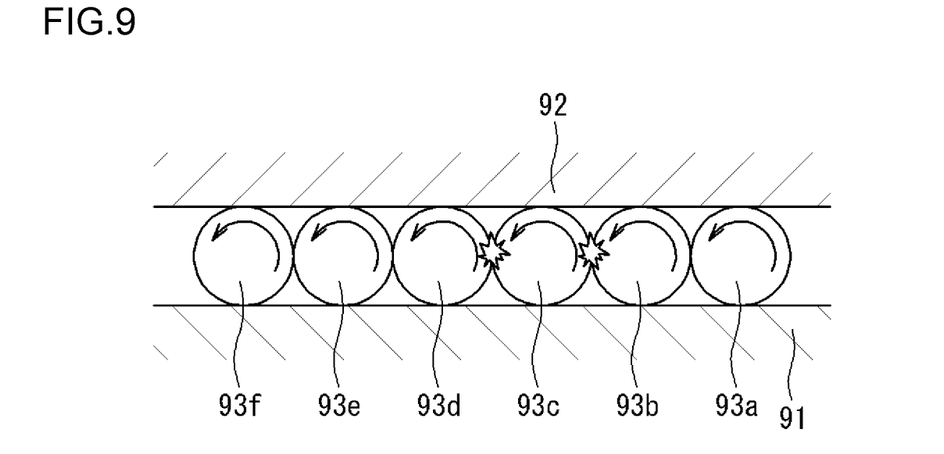
FIG. 9 is an explanatory diagram illustrating main balls located on a first axial side in a related-art ball train.

In the case of the braking device illustrated in FIG. 7, a braking force is generated by bringing the pad 96 into contact with the disk 100. In order to generate a braking force, in the ball screw device 90, the screw shaft 91 is rotated to move the nut 92 and the housing 94 from a first axial side to a second axial side (from the right side to the left side in FIG. 7), thereby pressing the pad 96 against the disk 100. Then, the housing 94 receives a reaction force, so that a relatively large axial force is applied to the nut 92. In FIG. 8, as described above, when the nut 92 moves from the first axial side to the second axial side while a relatively large axial force is applied to the nut 92, the main balls 93 attempt to rotate and move to the first axial side along the helical groove 92a of the nut 92. Then, in the ball train 97, the plurality of (six in FIG. 8) main balls 93a to 93f disposed continuously on the first axial side rub against each other. The resulting resistance reduces the efficiency of the ball screw device (ball screw efficiency). As illustrated in FIG. 9, the main balls 93a to 93f rotate in the same direction (counterclockwise direction in FIG. 9). Therefore, when the main balls 93a to 93f become especially stagnant, some of the continuously disposed main balls 93a to 93f, for example, the adjacent main balls 93b and 93c located at the center, and the adjacent main balls 93c and 93d, are respectively brought into close contact, and slide on each other to mutually hinder their rotation. That is, rubbing occurs, resulting in a resistance.

The ball screw efficiency is greatly affected by the lead angle and the friction coefficient. Specifically, the ball screw efficiency is improved by increasing the lead angle. Also, the ball screw efficiency is improved by reducing the friction coefficient. Accordingly, the ball screw efficiency can be improved by appropriately adjusting the lead angle and the friction coefficient.

SUMMARY OF THE INVENTION

An object of the present invention is to improve the ball screw efficiency by using a technique other than appropriately adjusting the lead angle and the friction coefficient.

A ball screw device according to an aspect of the present invention includes: a screw shaft having an outer periphery in which a first helical groove is formed; a nut disposed on the outer periphery of the screw shaft and having an inner periphery in which a second helical groove is formed; a ball train including a plurality of main balls disposed between the first helical groove and the second helical groove; and a plurality of spacer members that are formed of coil springs or balls having a smaller diameter than the main balls, and are disposed in the ball train; wherein the nut moves from a first axial side to a second axial side while an axial force is applied to the nut by rotation of the screw shaft; and wherein the plurality of spacer members are more densely arranged on the first axial side than on the second axial side in the ball train.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
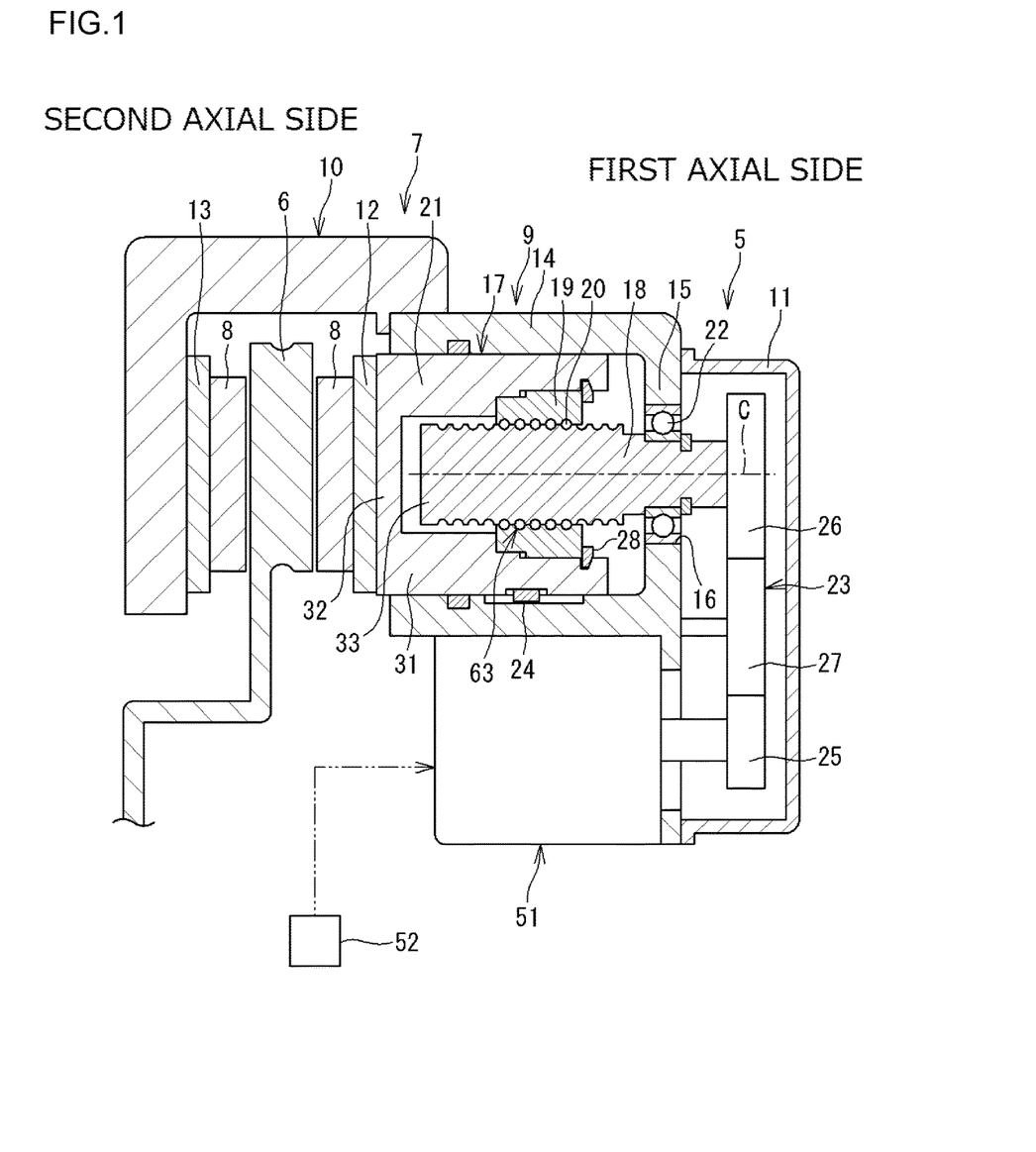
FIG. 1 is a cross-sectional view illustrating an example of a braking device.

A ball screw device according to the present invention is used for, for example, a braking device for a vehicle (automobile). FIG. 1 is a cross-sectional view illustrating an example of a braking device 5. The braking device 5 applies a braking force generated by friction to a disk 6 that rotates with the wheels of the automobile. To generate the braking force, the braking device 5 includes a ball screw device 17. In FIG. 1, the braking device 5 is in a non-braking state.

The braking device 5 includes a floating type caliper 7, and paired pads 8 that hold the disk 6 therebetween. The caliper 7 is supported by a knuckle (not illustrated) or the like. The paired pads 8 hold the disk 6 therebetween. The caliper 7 includes a first body 9, a second body 10, and a cover 11. The second body 10 is integral with the first body 9. The cover 11 is attached to the first body 9. One of the pads 8 (on the right side in FIG. 1) is supported by a first backup plate 12 attached to a housing 21 (described below) of the ball screw device 17. The other one of the pads 8 (on the left side in FIG. 1) is supported by a second backup plate 13 attached to the second body 10.

The first body 9 has a cylindrical shape (bottomed cylindrical shape) including a cylindrical body portion 14 and a bottom plate portion 15, and is open toward the disk 6. The ball screw device 17 is disposed on the inner side of the cylindrical body portion 14. The ball screw device 17 includes a screw shaft 18, a nut 19, a plurality of main balls 20, and the housing 21. An axis C of the screw shaft 18 coincides with the axis of the ball screw device 17. The direction parallel to the axis C is referred to as an axial direction.

A through hole 16 is formed in the bottom plate portion 15 of the first body 9. A rolling bearing 22 is attached to the through hole 16. The screw shaft 18 is supported by the first body 9 via the rolling bearing 22 to be rotatable in the circumferential direction about the axis C but not to be movable in the axial direction. A key 24 is disposed between the housing 21 and the cylindrical body portion 14. The housing 21 is reciprocally movable with respect to the cylindrical body portion 14 in the axial direction, but is not rotatable in the circumferential direction about the axis C.

The nut 19 and the housing 21 are integrated into one unit as will be described below. When the screw shaft 18 rotates in one direction (rotates normally), the nut 19 and the housing 21 move from a first axial side (right side it FIG. 1) to a second axial side (left side in FIG. 1) along the screw shaft 18. On the other hand, when the screw shaft 18 rotates in the other direction (rotates reversely), the nut 19 and the housing 21 move from the second axial side to the first axial side along the screw shaft 18. In the braking device 5 of FIG. 1, the moving housing 21 serves as a piston. The first body 9 (cylindrical body portion 14) serves as a cylinder that accommodates and guides the housing 21.

A motor (electric motor) 51 and a speed reducer 23 are provided on the outer side of the cylindrical body portion 14. A command signal is input from a control unit 52 to the motor 51, and the motor 51 rotates normally, rotates reversely, or stops, in accordance with the command signal. The speed reducer 23 includes a first gear 25, a second gear 26, and an intermediate gear 27. The first gear 25 is fixed to an output shaft of the motor 51. The second gear 26 is fixed to a second-axial-side end of the screw shaft 18. The intermediate gear 27 is disposed between the gears 25 and 26. Note that the speed reducer 23 may have a different configuration.

With the configuration described above, when the motor 51 rotates, the nut 19 and the housing 21 move in the axial direction. That is, rotational motion of the screw shaft 18 transmitted from the motor 51 via the speed reducer 23 is converted into linear motion of the nut 19 (and the housing 21) in the axial direction, by the ball screw device 17. Thus, the paired pads 8 hold the disk 6 to generate a braking force.

Figure 2:
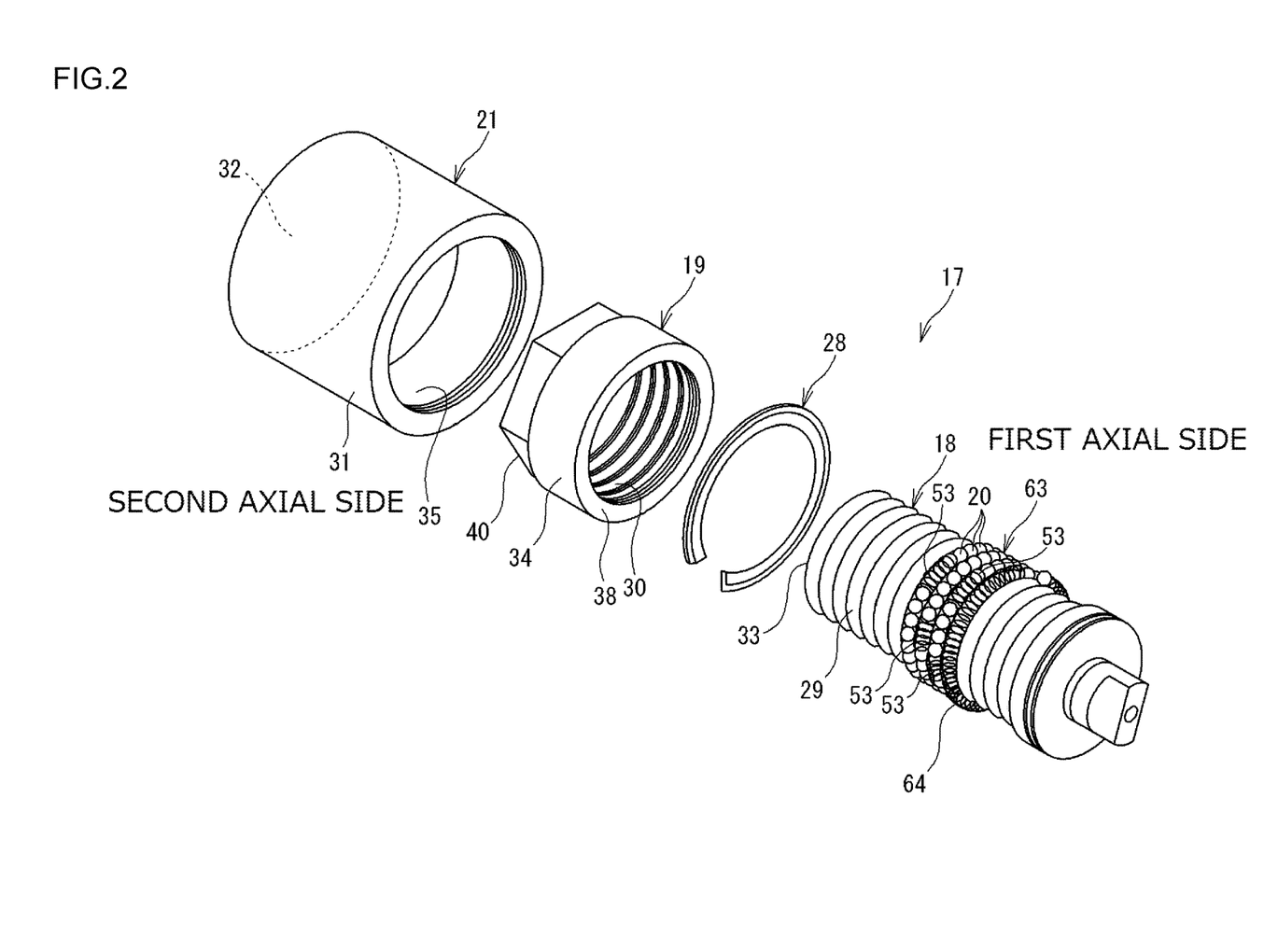
FIG. 2 is an exploded perspective view illustrating a ball screw device.
Figure 3:
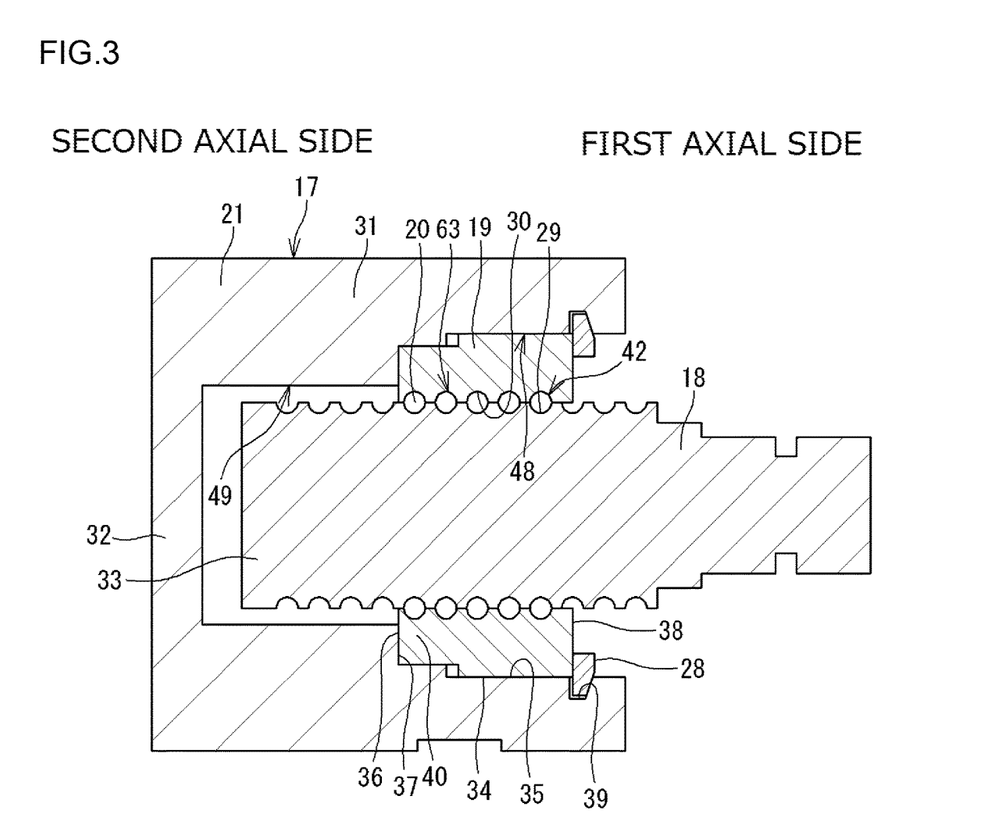
FIG. 3 is a cross-sectional view illustrating the ball screw device.

FIG. 2 is an exploded perspective view illustrating the ball screw device 17. FIG. 3 is a cross-sectional view illustrating the ball screw device 17. As illustrated in FIGS. 2 and 3, the ball screw device 17 includes the screw shaft 18 as an input member, and the nut 19 as an output member disposed on the outer periphery of the screw shaft 18. The ball screw device 17 of the present embodiment further includes the housing 21. The housing 21 has a bottomed cylindrical shape including a cylindrical portion 31 and a bottom portion 32. The housing 21 can accommodate a second-axial-side end 33 of the screw shaft 18 on the bottom portion 32 side, that is, the second axial side. Further, the nut 19 is attached to the housing 21 on the open side, that is, the first axial side. To attach (fix) the nut 19 to the housing 21, the ball screw device 17 includes a C-shaped snap ring 28 that is in contact with a first-axial-side end face 38 of the nut 19.

In FIG. 3, the cylindrical portion 31 of the housing 21 includes an inner peripheral surface 35, an annular surface 37, and a recessed groove 39. An outer peripheral surface 34 of the nut 19 fits to the inner peripheral surface 35. The annular surface 37 is in contact with a second-axial-side end face 36 of the nut 19. The snap ring 28 is attached to the recessed groove 39. The nut 19 is fitted to the inner peripheral surface 35 of the housing 21, and the snap ring 28 is attached to the recessed groove 39. Thus, the nut 19 is held between the annular surface 37 of the housing 21 and the snap ring 28 in the axial direction. Accordingly, the nut 19 is prevented from coming off from the first axial side of the housing 21. The space defined on the inner peripheral side of the housing 21 includes a hole portion 48 with a larger diameter and a hole portion 49 with a smaller diameter. The hole portion 48 includes the annular surface 37, and is located on the first axial side (open side) with respect to the annular surface 37. The hole portion 49 is located on the second axial side with respect to (the inner peripheral edge) of the annular surface 37. The nut 19 is attached to the hole portion 48 with the larger diameter.

As illustrated in FIG. 2, a second-axial-side end 40 of the nut 19 has a polygonal outer peripheral shape. A first axial side of the inner peripheral surface 35 of the housing 21 has a polygonal shape corresponding to the shape of the end 40 of the nut 19. Thus, the nut 19 and the housing 21 are integrated into one unit. The nut 19 and the housing 21 are not relatively rotatable.

In FIGS. 2 and 3, a first helical groove 29 is formed in the outer periphery of the screw shaft 18. A second helical groove 30 is formed in the inner periphery of the nut 19. The screw shaft 18 is longer than the nut 19 in the axial direction, and the first helical groove 29 is formed across a range greater than the nut 19 (second helical groove 30) in the axial direction. A ball train 63 including the plurality of main halls 20 is disposed between the first helical groove 29 and the second helical groove 30. Further, in the present embodiment, coil springs 53 are provided as spacer members (see FIG. 2) disposed between the main balls 20 and 20 in the ball train 63. Each coil spring 53 is hereinafter referred to as an intermediate spring 53. As in the specific example described below, the intermediate springs 53 are disposed at intervals in the ball train 63.

Figure 4:
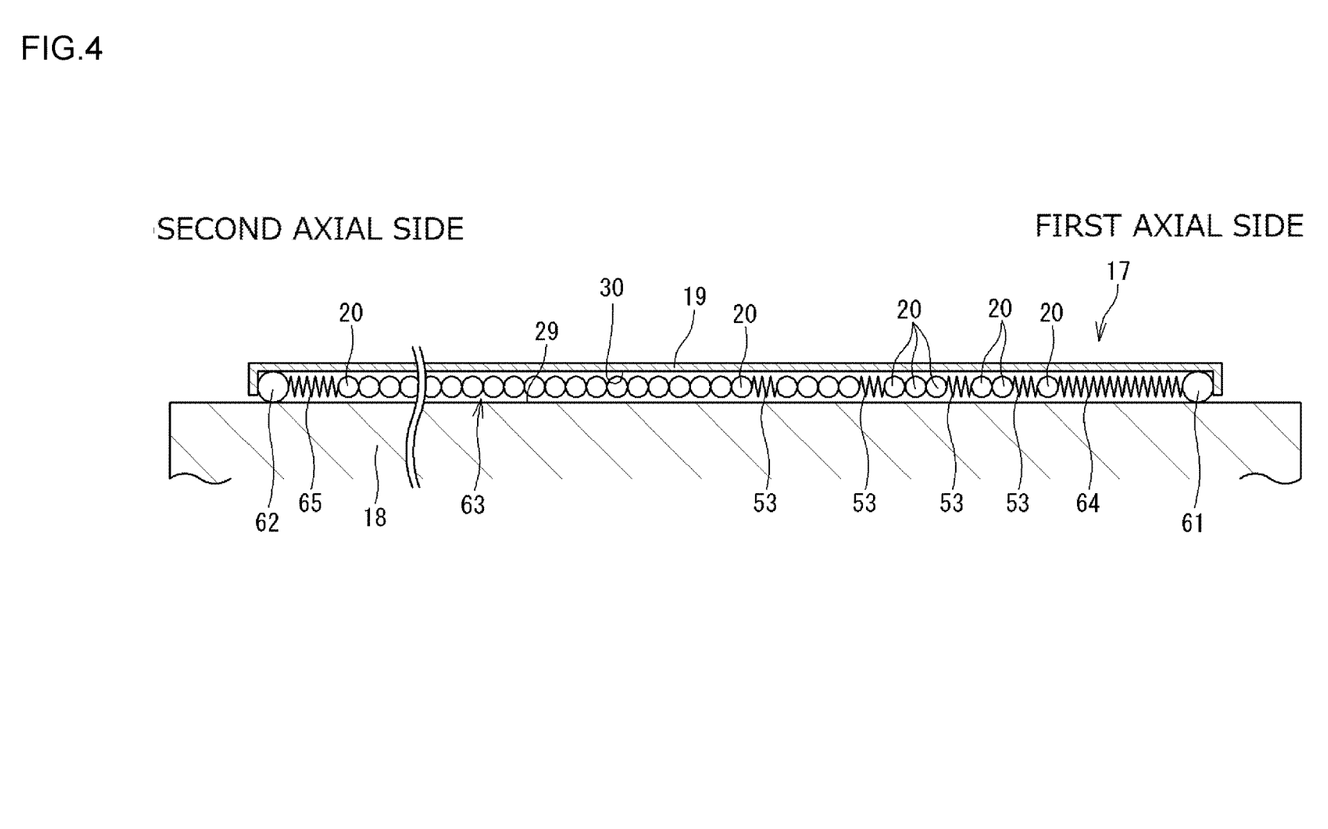
FIG. 4 is an explanatory diagram illustrating a first helical groove and a second helical groove developed on a plane.

FIG. 4 is an explanatory diagram illustrating the first helical groove 29 of the screw shaft 18 and the second helical groove 30 of the nut 19 developed on a plane. The plurality of (four in FIG. 4) intermediate springs 53 are more densely arranged on the first axial side (right side in FIG. 4) than on the second axial side (left side in FIG. 4) in the ball train 63. The number of intermediate springs 53 is not limited to four, and may be changed.

All the main balls 20 (ball train 63) are accommodated on the inner peripheral side of the nut 19. Stoppers 61 and 62 are disposed at the opposite axial ends on the inner peripheral side (second helical groove 30) of the nut 19. The first stopper 61 on the first axial side is a ball having a greater diameter than the main balls 20, and is immovably disposed on the nut 19. The second stopper 62 on the second axial side is a pin member fixed to a hole in the nut 19, and is immovable. Each of the first stopper 61 and the second stopper 62 is disposed so as not to fall out of the second helical groove 30, and serves as a member to prevent the ball train 63 including the intermediate springs 53 from falling out. Each of the first stopper 61 and the second stopper 62 may have a different form.

Further, on the inner peripheral side of the nut 19, a first end spring 64 is disposed between the outermost main ball 20 on the first axial side in the ball train 63 and the first stopper 61. A second end spring 65 is disposed between the outermost main ball 20 on the second axial side in the ball train 63 and the second stopper 62. Each of the first end spring 64 and the second end spring 65 is a coil spring. In this manner, in the present embodiment, the first stopper 61 and the first end spring 64 are disposed on the first axial side in the second helical groove 30 of the nut 19. The second stopper 62 and the second end spring 65 are disposed on the second axial side in the second helical groove 30. The ball train 63 including the intermediate springs 53 is disposed between the first end spring 64 and the second end spring 65. When the ball screw device 17 is not rotating, all the intermediate springs 53 and the end springs 64 and 65 are slightly compressed.

The ball screw device 17 of the present embodiment with the configuration described above is of a non-circulation type in which the main balls 20 do not circulate. It is known that, in this ball screw device 17, when the nut 19 moves in the axial direction, a delay occurs in advancement of the main balls 20. The delay in advancement is caused by, for example, unbalanced load such as moment load (bending load) applied to the ball screw device 17, and the distortion of the helical grooves 29 and 30. In view of this, the intermediate springs 53 are disposed in the ball train 63. Since the intermediate springs 53 elastically deform, it is possible to reduce the delay in advancement of the main balls 20 while the ball screw device 17 is operating. Thus, the friction between the main balls 20 is reduced.

In the braking device 5 illustrated in FIG. 1, as described above, in order to generate a braking force by bringing the pads 8 into contact with the disk 6, the screw shaft 18 is rotated to move the nut 19 and the housing 21 from the first axial side to the second axial side (from the right side to the left side in FIG. 1) in the ball screw device 17, thereby pressing the pads 8 against the disk 6. Then, the housing 21 receives a reaction force, so that a relatively large axial force is applied to the nut 19. In this way, when the nut 19 moves from the first axial side to the second axial side While a relatively large axial force is applied to the nut 19, the main balls 20 attempt to rotate and move to the first axial side along the second helical groove 30 in FIG. 4.

In the related-art ball screw device, as described with reference to FIGS. 8 and 9, the main balls 93a to 93f on the first axial side become slightly stagnant and rub against each other. The resulting resistance reduces the ball screw efficiency. Meanwhile, in the present embodiment (see FIG. 4), the intermediate springs 53 are more densely arranged on the first axial side than on the second axial side in the ball train 63. Therefore, it is possible to more effectively prevent stagnation of the main balls 20 on the first axial side. With this configuration, it is possible to reduce rubbing between the adjacent main balls 20 and 20, and improve the ball screw efficiency. Note that although the plurality of main balls 20 on the second axial side in the ball train 63 also attempt to rotate and move to the first axial side, the plurality of main balls 20 on the second axial side move with a delay with respect to the main balls 20 on the first axial side, and therefore are relatively less likely to become stagnant. Accordingly, rubbing is relatively less likely to occur on the second axial side in the ball train 63. Thus, even though the intermediate springs 53 are not densely arranged on the second axial side, this is not likely to cause a reduction in ball screw efficiency.

A specific example of the arrangement of the main balls 20 and the intermediate springs 53 will be described. The outermost (rightmost in. FIG. 4) main ball 20 on the first axial side in the ball train 63 is referred to as a "first main ball 20". The main ball 20 that is immediately adjacent on the second axial side (left side in FIG. 4) to the first main ball 20 is referred to as a "second main ball 20". Similarly, the main balls 20 that follow on the second axial side are referred to as a "third main ball 20", a "fourth main ball 20", a "fifth main ball 20", and so on. As for the plurality of intermediate springs 53 in the ball train 63, the outermost (rightmost in FIG. 4) intermediate spring 53 on the first axial side is referred to as a "first intermediate spring 53". The intermediate spring 53 that is immediately adjacent on the second axial side to the first intermediate spring 53 is referred to as a "second intermediate spring 53". Similarly, the intermediate springs 53 that follow on the second axial side are referred to as a "third intermediate spring 53", a "fourth intermediate spring 53", a "fifth intermediate spring 53", and so on.

When stagnation occurs on the first axial side in the ball train 63, the first main ball 20 is likely to be subjected to be a heavy load (in some related-art devices). In the present embodiment illustrated in FIG. 4, the first main ball 20 is disposed between the first end spring 64 and the first intermediate spring 53. Therefore, the first end spring 64 and the first intermediate spring 53 are elastically deformed. This allows the load described above to be released, and allows the first main ball 20 to rotate smoothly. Two of the main balls 20 are continuously disposed on the second axial side of the first intermediate spring 53, and the second intermediate spring 53 is disposed adjacent thereto. Three of the main balls 20 are continuously disposed on the second axial side of the second intermediate spring 53, and the third intermediate spring 53 is disposed adjacent thereto. Similarly, the main balls 20 that follow are arranged such that the number of main balls 20 that are continuously disposed between one of the intermediate springs 53 and the intermediate spring 53 located on the second axial side thereof increases to the second axial side. A greater number of main balls 20 are continuously disposed on the second axial side than on the first axial side in the ball train 63. With this configuration, the intermediate springs 53 are more densely arranged on the first axial side than on the second axial side in the ball train 63. Note that the number of main balls 20 and the number of intermediate springs 53 illustrated in FIG. 4 are examples, and may be changed in accordance with the model number (size) of the ball screw device 17, for example.

Figure 5A:
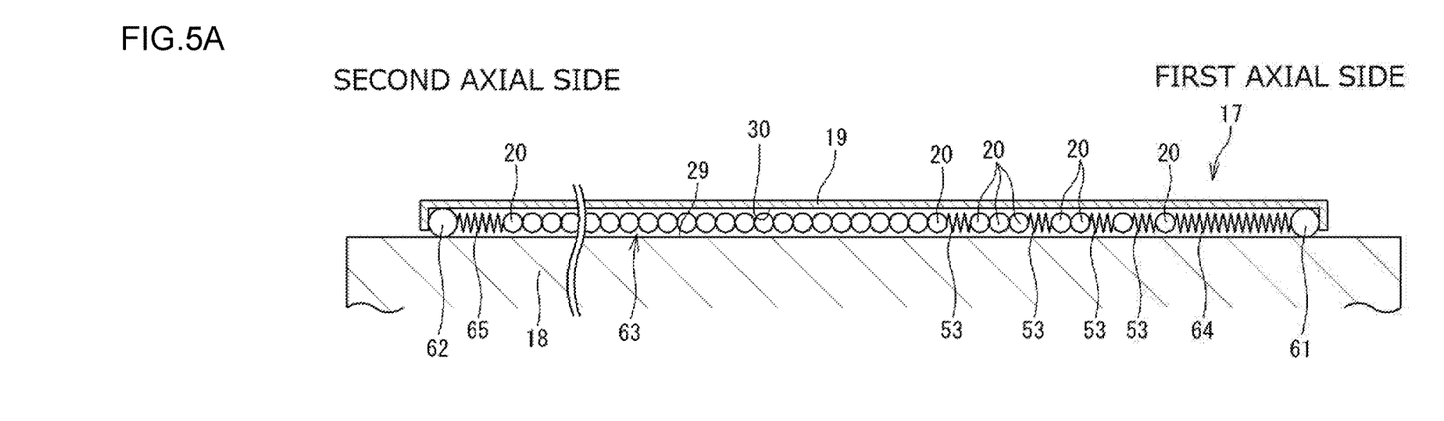
FIGS. 5A and 5B are diagrams each illustrating a modification of the arrangement of main balls and intermediate springs.
Figure 5B:
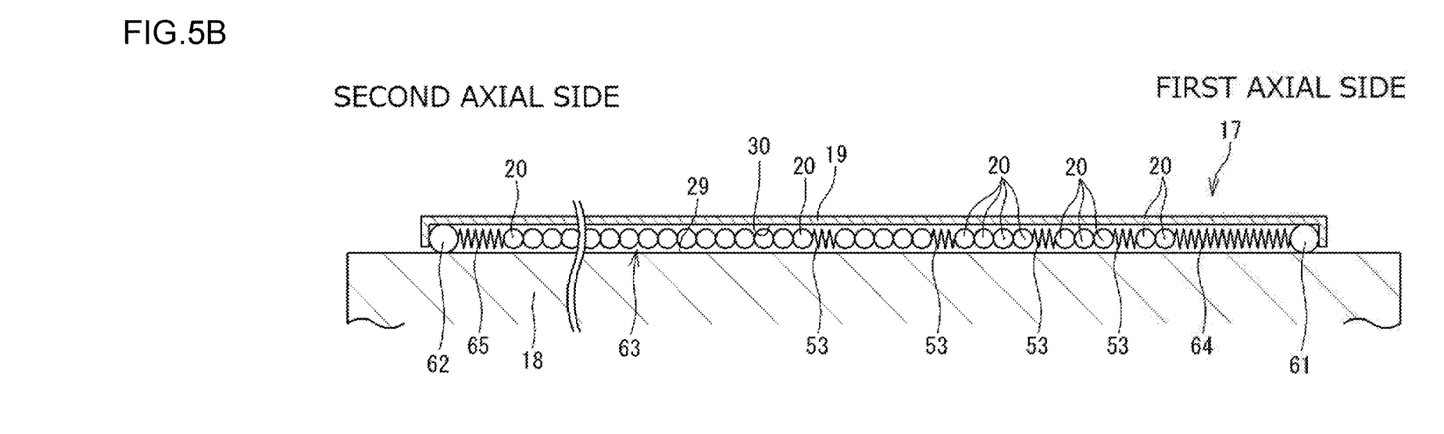

FIG. 5A illustrates a modification of the arrangement of the main balls 20 and the intermediate springs 53. In FIG. 5A, the number of main balls 20 disposed between the first end spring 64 and the first intermediate spring 53 is one (as in the embodiment illustrated in FIG. 4). The number of main balls 20 disposed between the first intermediate spring 53 and the second intermediate spring 53 is also one. In this manner, the same number of main balls 20 may be disposed on each side of one of the intermediate springs 53 (the first intermediate spring 53). FIG. 5B illustrates another modification. In FIG. 5B, the first main ball 20 and the second main ball 20 are continuously arranged. The first intermediate spring 53 is disposed adjacent thereto on the second axial side. In this manner, the number of main balls 20 disposed between the first end spring 64 and the first intermediate spring 53 does not have to be one.

In each of the embodiments illustrated in FIGS. 4, 5A, and 5B, the number of main balls 20 between the intermediate springs 53 and 53 that are adjacent along the helical ball train 63 decreases from the second axial side to the first axial side (from the left side to the right side in FIGS. 4, 5A, and 5B). With this configuration, the intermediate springs 53 are more densely arranged on the first axial side than on the second axial side in the ball train 63.

In the manner described above, in the ball screw device 17 of each embodiment, the nut 19 moves from the first axial side to the second axial side (from the right side to the left side in the drawings) while the axial force is applied to the nut 19 by rotation of the screw shaft 18. In this step, the ball train 63 having a helical shape attempts to rotate and move to the first axial side along the second helical groove 30. If the plurality of main balls 20 on the first axial side in the ball train 63 become slightly stagnant and come into close contact with each other, the main balls 20 are likely to rub against each other. However, as described above, the intermediate springs 53 are more densely arranged on the first axial side than on the second axial side in the ball train 63. Since the intermediate springs 53 elastically deform, it is possible to prevent stagnation of the main balls 20, and reduce rubbing between the main balls 20 and 20. As a result, the ball screw efficiency can be improved. As described above, the plurality of main balls 20 on the second axial side in the ball train 63 having a helical shape is relatively less likely to become stagnant. Accordingly, rubbing is less likely to occur. Thus, even though the intermediate springs 53 are not densely arranged on the second axial side, this is not likely to cause a reduction in ball screw efficiency.

As described above, when generating a braking force in the braking device 5 of FIG. 1, the nut 19 moves from the first axial side to the second axial side while an axial force is applied to the nut 19 by rotation (normal rotation) of the screw shaft 18. Meanwhile, when releasing a braking force in the braking device 5, the screw shaft 18 may be rotated in the reverse direction. Thus, the nut 19 moves from the second axial side to the first axial side (from the left side to the right side in the drawings). However, the axial force having been applied to the nut 19 in the early stage of the movement is lost, and almost no axial force is applied to the nut 19 thereafter.

As illustrated in each of FIGS. 4, 5A, and 5B, the first end spring 64 is disposed on the first axial side of the ball train 63, and the second end spring 65 is disposed on the second axial side. Therefore, as described above, when almost no axial force is applied to the nut 19, the ball train 63 is almost in a neutral position, and the main balls 20 of the ball train 63 and the nut 19 (second helical groove 30) hardly move relative to each other. The nut 19 can be moved to the first axial side, with sliding motion between the main balls 20 of the ball train 63 and the screw shaft 18 (first helical groove 29). The neutral position is the position where the ball train 63 is located when the ball screw device 17 is not rotating.

Figure 6:
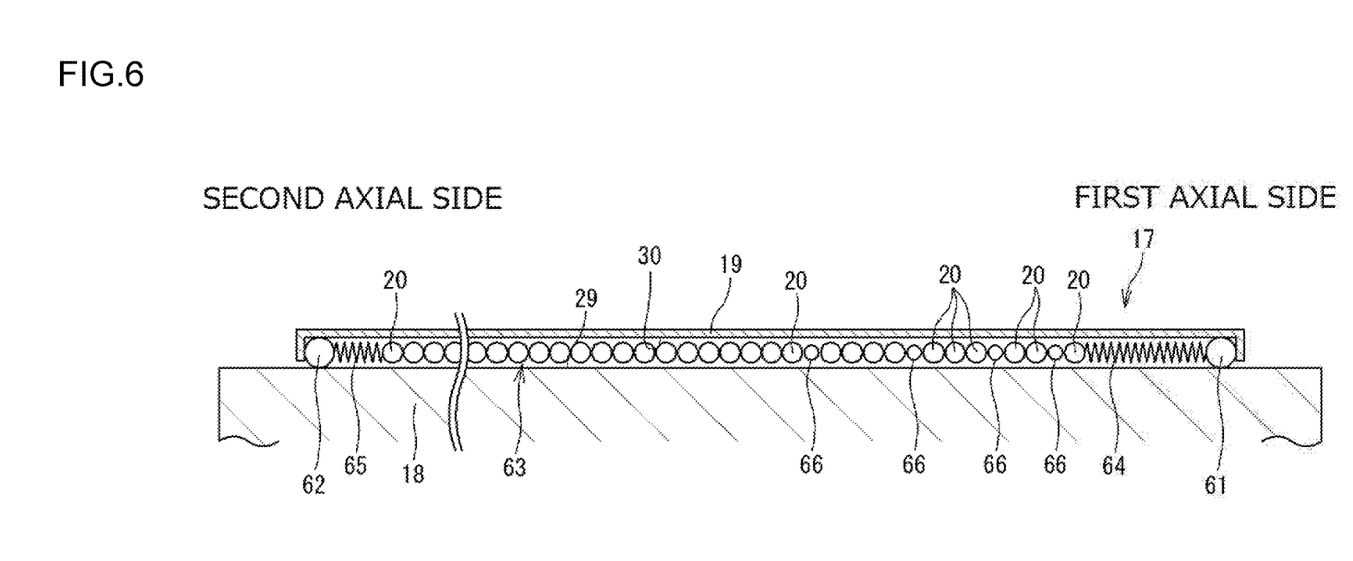
FIG. 6 is an explanatory diagram illustrating a modification of the ball screw device.

In each of the embodiments, the intermediate springs 53 formed of coil springs and serving as spacer members are disposed at intervals in the ball train 63. However, as illustrated in FIG. 6, in place of the intermediate springs (coil springs) 53, balls (spacer balls) 66 having a smaller diameter than the main balls 20 may be provided as spacer members. The plurality of spacer balls 66 are more densely arranged on the first axial side than on the second axial side in the ball train 63. As in the cases of the intermediate springs 53 illustrated in FIGS. 5A and 5B, the arrangement of the spacer balls 66 may be changed in accordance with the model number of the ball screw device 17 as long as the spacer balls 66 are densely arranged on the first axial side in the ball train 63.

As described above, in the ball screw device in which the nut 19 moves from the first axial side to the second axial side while an axial force is applied to the nut 19 by rotation of the screw shaft 18, spacer members are disposed at intervals in the ball train 63. The spacer members are formed of coil springs (intermediate springs 53), or balls (spacer balls 66) having a smaller diameter than the main balls 20. The plurality of spacer members (intermediate springs 53 or spacer balls 66) are more densely arranged on the first axial side than on the second axial side in the ball train 63. With this configuration, it is possible to reduce rubbing between the main balls 20 on the first axial side, which is likely to occur in related-art ball screw devices, and improve the ball screw efficiency.

In the ball screw device 17 of each of the above embodiments, the intermediate springs 53 (spacer balls 66) are less densely arranged in the second-axial-side region than in the first-axial-side region in the ball train 63. This is to prevent a reduction in the load capacity of the ball screw device 17. That is, if the intermediate springs 53 (spacer balls 66) are provided in place of the main balls 20 in the second-axial-side region, and the intermediate springs 53 (spacer balls 66) are densely arranged in the second-axial-side region as well, the number of main balls 20 is reduced. As a result, the load capacity of the ball screw device 17 is reduced. If the number of intermediate springs 53 is increased on the second axial side as well, without reducing the number of main balls 20 so as not to reduce the load capacity of the ball screw device 17, the length of the ball train 63 is increased. Accordingly, the size of the ball screw device 17 is increased. In each of the above embodiments, to maintain the load capacity, and to prevent an increase in size, the intermediate springs 53 (spacer balls 66) are more densely arranged on the first axial side without changing the number of main balls 20 and the number of intermediate springs 53 (spacer balls 66).

The presently disclosed embodiments should be considered in all respects to be illustrative and not restrictive. Accordingly, the ball screw device of the present invention is not limited to the illustrated embodiments, and modifications and other embodiments are intended to be included within the scope of the invention. Although the ball screw device 17 of the above embodiments is of a non-circulation type in which the main balls 20 do not circulate, the ball screw device 17 may be of a circulation type. However, in the case of the circulation type, the moving stroke of the nut 19 needs to be small. The main balls 20 located on the first axial side in the ball train 63 need to be located on the first axial side both before and after the operation. In the above description, the ball screw device 17 is used for a braking device. However, the ball screw device 17 is applicable to other devices.

According to the present invention, in a ball screw device in which a nut moves from a first axial side to a second axial side while an axial force is applied to the nut by rotation of a screw shaft, spacer members are densely arranged on the first axial side. With this configuration, it is possible to reduce rubbing between the main balls on the first axial side, which is likely to occur in related-art ball screw devices, and improve the ball screw efficiency.

What is claimed is:

1. A ball screw device comprising:
   a screw shaft having an outer periphery in which a first helical groove is formed;
   a nut disposed on the outer periphery of the screw shaft and having an inner periphery in which a second helical groove is formed;
   a ball train including a plurality of main balls disposed between the first helical groove and the second helical groove; and
   a plurality of spacer members that are formed of coil springs or balls having a smaller diameter than the main balls, and are disposed in the ball train;
   wherein the nut moves from a first axial side to a second axial side while an axial force is applied to the nut by rotation of the screw shaft; and
   wherein the plurality of spacer members are more densely arranged on the first axial side than on the second axial side in the ball train.

2. The ball screw device according to claim 1, wherein the number of main balls between the spacer members that are adjacent along the helical ball train decreases from the second axial side to the first axial side.

3. The ball screw device according to claim 1, wherein the spacer members are formed of coil springs.

4. The ball screw device according to claim 1, further comprising:
   a first stopper and a first end spring on the first axial side in the second helical groove, the first stopper preventing the ball train from falling out, the first end spring being disposed between the outermost main ball on the first axial side in the ball train and the first stopper; and
   a second stopper and a second end spring on the second axial side in the second helical groove, the second stopper preventing the ball train from falling out, the second end spring being disposed between the outermost main ball on the second axial side in the ball train and the second stopper.

* * * * *